(12) United States Patent  
Seki

(10) Patent No.: US 7,689,119 B2  
(45) Date of Patent: Mar. 30, 2010

(54) DIGITAL CAMERA THAT STORES THE LOCATION OF AN OBJECT

(75) Inventor: Seikon Seki, Yokohama (JP)

(73) Assignee: Ricoh Company Ltd., Tokyo (JP)

( * ) Notice: Subject to any disclaimer, the term of this patent is extended or adjusted under 35 U.S.C. 154(b) by 517 days.

(21) Appl. No.: 11/489,635

(22) Filed: Jul. 20, 2006

(65) Prior Publication Data

US 2007/0030361 A1    Feb. 8, 2007

(30) Foreign Application Priority Data

Jul. 20, 2005    (JP) .............................. 2005-210185

(51) Int. Cl.
G03B 19/00    (2006.01)
G03B 17/00    (2006.01)
H04N 5/228    (2006.01)

(52) U.S. Cl. ........................... 396/429; 396/50; 396/53; 348/208.2; 348/208.14

(58) Field of Classification Search ................. 396/429, 396/50, 52, 53; 348/208.2, 208.14
See application file for complete search history.

(56) References Cited

U.S. PATENT DOCUMENTS

| | | | | |
|---|---|---|---|---|
| 5,768,640 | A * | 6/1998 | Takahashi et al. | 396/310 |
| 5,913,078 | A * | 6/1999 | Kimura et al. | 396/50 |
| 6,829,430 | B1 * | 12/2004 | Ashizaki et al. | 386/117 |
| 6,873,357 | B2 * | 3/2005 | Fuchimukai et al. | 348/208.2 |
| 2003/0122945 | A1 * | 7/2003 | Muramatsu | 348/239 |
| 2003/0160867 | A1 * | 8/2003 | Ohto et al. | 348/135 |
| 2003/0231243 | A1 * | 12/2003 | Shibutani | 348/207.99 |
| 2006/0187317 | A1 * | 8/2006 | Montulli et al. | 348/231.5 |
| 2006/0239539 | A1 * | 10/2006 | Kochi et al. | 382/154 |

FOREIGN PATENT DOCUMENTS

| | | |
|---|---|---|
| JP | 09-247512 | 9/1997 |
| JP | 2003-344891 | 12/2003 |
| JP | 2004-007545 | 1/2004 |
| JP | 2004-064676 | 2/2004 |
| JP | 2004-080167 | 3/2004 |
| JP | 2004-080359 | 3/2004 |
| JP | 2004-102835 | 4/2004 |
| JP | 2004-104534 | 4/2004 |
| JP | 2004-336326 | 11/2004 |
| JP | 2005-051541 | 2/2005 |

* cited by examiner

*Primary Examiner*—Rochelle-Ann J Blackman
(74) *Attorney, Agent, or Firm*—Oblon, Spivak, McClelland, Maier & Neustadt, L.L.P.

(57) ABSTRACT

An image processing device including an optical system, a storage device, a position detecting device, and a direction detecting device. An optical system obtains an image of an object, and a storage device stores a predetermined position of an object to be shot. The position detecting device detects a current position of the image processing device, and the direction detecting device detects the directional orientation of the image processing device. A processor then determines whether an obtained object of shooting corresponds to the object to be shot by comparing signals output from said position detecting device and said direction detecting device with the stored position of the object to be shot.

16 Claims, 9 Drawing Sheets

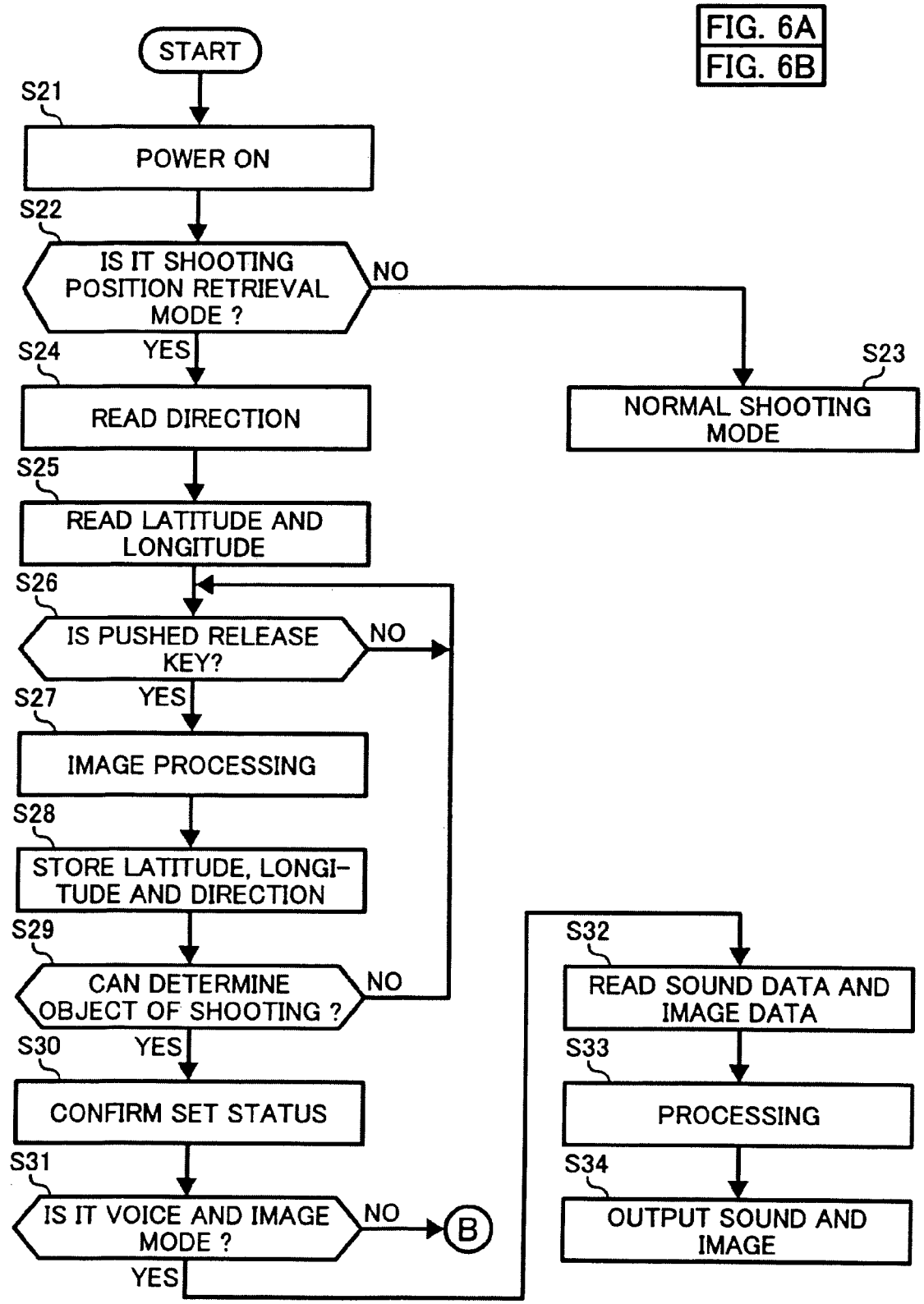

DIGITAL CAMERA THAT STORES THE LOCATION OF AN OBJECT

BACKGROUND OF THE INVENTION

1. Field of the Invention

The present invention relates to an image processing device such as a digital camera. More particularly, the present invention relates to a digital camera configured to identify a shooting place or an object of shooting.

2. Description of the Background

An image processing device for detecting its position by using a position detecting device is proposed by Japanese Laid-open patent application 2004-102835. This image processing device detects its position, and displays the information regarding an environment of the position.

Furthermore, a digital camera for recording a shot image with one or more additional information input by a user is proposed by Japanese Laid-open patent application 2004-104534.

Technology for correcting white balance that causes a color temperature change in scene illumination is described by a Japanese Laid-open patent application 2004-007545.

Furthermore, a digital camera for selecting the optimum shooting mode from a plurality of shooting modes based on an object of shooting or a detected shooting scene is proposed by Japanese Laid-open patent application 2003-344891. The digital camera sets a shooting mode by using a face recognizing means for recognizing that an object of shooting includes a face, and uses a means for recognizing a situation of the object of shooting.

Furthermore, a digital camera for adjusting white balance in the context of electrical zooming is proposed by Japanese Laid-open patent application 2004-080167.

A digital camera for changing white balance according to a scene is proposed by Japanese Laid-open patent application 2004-064676.

However, the above-mentioned digital cameras can not identify easily when a user wants to shoot a predetermined object. Therefore, the user should know a shooting position and shooting direction in advance. Further, digital cameras having a positioning function by GPS (Global Positioning System), can determine a location, but do not know a shooting direction of the digital camera. Further, a conventional digital camera can not change the white balance in accordance with a direction of a camera or an altitude of the location of the camera.

SUMMARY OF THE INVENTION

The present invention was made in consideration of the above-mentioned problems, and it is an object of the present invention to solve these problems.

It is another object of the present invention to provide an image processing device such as a digital camera which is improved in a usability, and can identify the place where there is an object of shooting.

It is another object of the present invention to provide an image processing device such as a digital camera which can notify an object of shooting to the user of the image processing device based on the shooting direction and the location of the image processing device.

It is another object of the present invention to provide an image processing device such as a digital camera which changes a image parameter in accordance with a tilt of the image processing device, a shooting direction, or an altitude of the image processing device.

The present invention achieves the above-noted operation by providing a novel image processing device, which for example can be used for a digital camera.

An exemplary embodiment of the novel image processing device includes an optical system, a storage device, a position detecting means, a direction detecting means, and a determining means.

An optical system obtains an image of an object of shooting. A storage device stores a predetermined position of an object of shooting preliminarily. A position detecting means detects a current position of said image processing device. A direction detecting means detects a direction which said image processing device is aimed, and a determining means determines whether an obtained object of shooting is same to the predetermined object of shooting stored in said storage device by using signals output from said position detecting means and said direction detecting means.

BRIEF DESCRIPTION OF THE DRAWINGS

A more complete application of the present invention and many of the attendant advantages thereof will be readily obtained as same becomes better understood by reference to the following detailed description when considered in connection with the accompanying drawings, wherein.

DESCRIPTION OF THE PREFERRED EMBODIMENT

Figure 1:
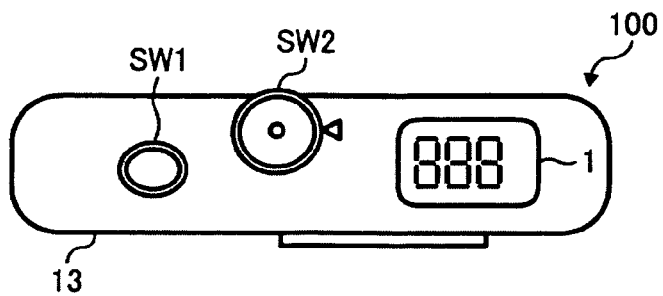
FIG. 1 is a top view showing a digital camera in an embodiment according to one embodiment of the present invention.
Figure 2:
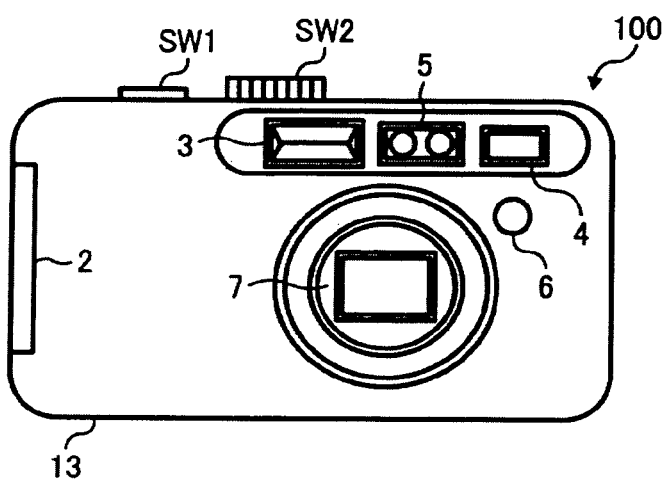
FIG. 2 is a front view a digital camera in an embodiment according to one embodiment of the present invention.
Figure 3:
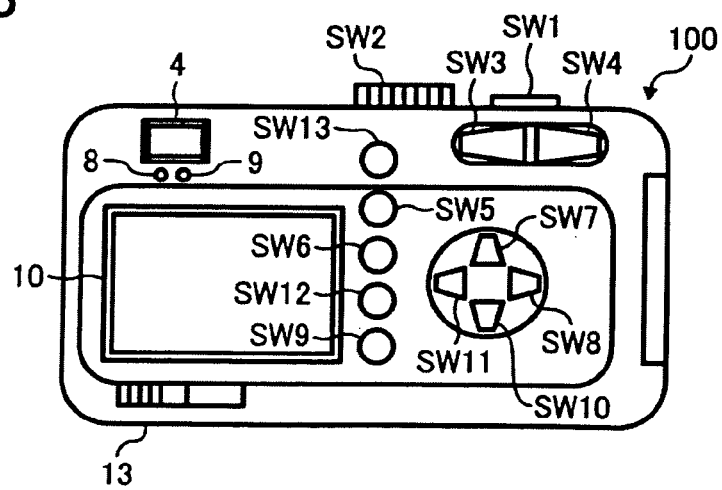
FIG. 3 is a back view a digital camera in an embodiment according to one embodiment of the present invention.

Referring now to the drawings, wherein like reference numerals designate identical or corresponding parts throughout the several views, and more particularly to FIG. 1-FIG. 3 thereof, there is illustrated an appearance of a digital camera 100.

Figure 4:
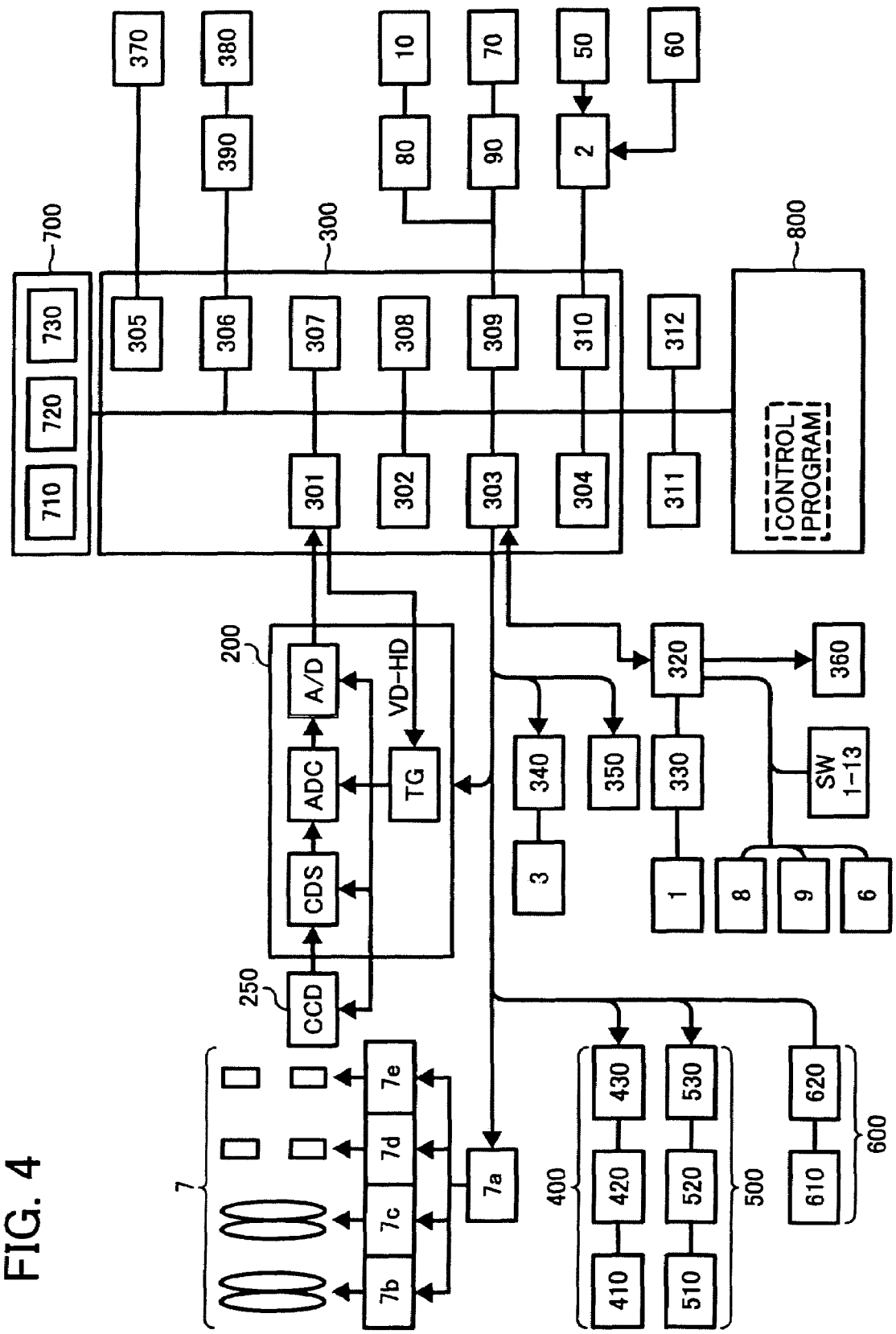
FIG. 4 is a block diagram showing a signal processing system in an embodiment according to the present invention.

This digital camera 100 includes a camera body 13, a sub-LCD (liquid crystal display) 1, card slots 2, an electronic flash portion 3, an optical finder 4, a distance measuring unit 5, a remote control light-sensitive portion 6, a lens barrel unit 7, an AF-LED (auto focus light-emitting diode) 8, a strobe LED (strobe light-emitting diode) 9, a LCD monitor 10 (liquid crystal display monitor) and switches SW1-SW13. FIG. 4 shows a signal processing system of the digital camera.

The lens barrel unit 7 includes zoom optical system 7b having a zoom lens group and a zoom driving zoom motor, focus optical system 7c having a focus lens group and a focus driving zoom motor, an aperture unit 7d having an aperture and an aperture motor, a mechanical shutter unit 7e having a mechanical shutter and a mechanical shutter motor, a motor driver 7a for driving a each of motors. The motor driver 7a drives each motor in accordance with a driving command sent from a CPU unit 303, the CPU unit sends a driving command based on an instruction input from the remote control light-sensitive portion 6 or an operation key unit SW1-SW13.

A control program and parameters described by codes which can be decoded by CPU block 303 are stored in a ROM 800.

When the power supply of the digital camera 100 is turned on, the above-mentioned program is loaded to the main memory not shown, the CPU block 303 controls an operation of each portion in the digital camera 100 according to the program, and the CPU block 303 temporarily stores the data used to the control the RAM 311 and a local SRAM 304. The flash ROM can be used instead to the ROM 800. In that case, the control program or the parameters can be changed to easily upgrade the functions of the digital camera.

The CCD 250 is a solid-state image sensing device, which is photoelectric transducer. The F/E IC (front/end integrated circuit) 200 includes a CDS circuit for removing the noise in an image, an AGC circuit for adjusting gains, an A/D circuit for changing the analog data to digital data, and a TG (timing generator). The TG (timing generator) supplies the vertical synchronization signal (hereinafter called VD) and the horizontal synchronization signal (hereinafter called HD), and is controlled by the CPU block 303. Furthermore, the TG (timing generator) generates a driving timing signal that is sent to the CCD, the CDS circuit, the AGC circuit, and the A/D circuit.

The digital camera processing unit 300 includes a CCD1 control block 301, a CCD2 control block 302, a CPU block 303, a local SRAM 304, a USB block 305, a serial block 306, a RESIZE block 308, a JPEG CODEC block 307, a TV signal display block 309, and a memory card controller 310.

The CCD1 control block 301 adjusts the white balance and gamma correction of the signal output from the F/E IC 200, and generates the VD and HD. The CCD2 control block 302 changes the RGB data to the luminance data and the color difference data. The CPU block 303 controls each portion of the digital camera. The local SRAM 304 stores data used for controlling. The USB block 305 communicates with a external device such as a personal computer using the USB protocol. The serial block 306 has a serial communication with a external device such as a personal computer. The RESIZE block 308 scales up or scales down the image data. The TV signal display block 309 changes the image data to the video signal for displaying on a external display device such as a liquid crystal monitor or a television. The memory card controller 310 controls a memory card, the GPS (Global Positioning System) card, etc.

The SDRAM 700 stores the image data temporarily, when the digital camera processing unit 300 processes the image data.

The data stored in the SDRAM 700 are the RAW-RGB image data 710, the YUV image data 720, the JPEG image data 730. The RAW-RGB image data 710 is adjusted using white balance and gamma correction by CCD1 control block 301, and the luminance data and color difference data of the YUV image data 720 is modified by CCD2 control block 302. The JPEG image data 730 is changed to the JPEG format by the JPEG CODEC block 307.

The memory card slots 2 are used for attaching, for example, a memory card and GPS (Global Positioning System) card, and the built-in memory 312 can store the image data even when the memory card detached from the memory card slot.

The LCD driver 80 is a driving circuit for driving the LCD monitor 10, and changes the video signal output from the TV signal display block 309 to the signal used for the LCD monitor 10. The LCD monitor 10 is used for confirming the object of shooting before shooting, for confirming the shot image, and for displaying the image data stored in the memory card or the built-in memory.

The video AMP 90 carries out the impedance conversion to the video signal output from the TV signal display block 309. The video connector 70 is used for connecting to the external display device such as a TV.

The USB connector 370 is used for USB connection to the external device such as a personal computer. The serial driver circuit 390 is used as voltage transducer for the serial communication with the external device such as a personal computer. The RS-232C connector 380 is used for the serial connection with the external device such as a personal computer.

The sub-CPU 320 includes a built-in ROM and a built-in RAM. Furthermore, the sub-CPU 320 forwards the output signal employed as user operation information from the operation key unit SW1-SW13 or the a remote control light-sensitive portion 6 to the CPU block 303. The sub-CPU 320 changes the signal regarding a status of the digital camera out put from the CPU block 303, and forwards the changed signal to the sub-LCD 1, the AF LED 8, the strobe LED 6, or the buzzer 360.

The sub-LCD 1 is a display portion, for example, for displaying the number of images which can be shot. The LCD driver 80 drives the sub-LCD 1 according to the output signal from the sub-CPU 320.

The AF LED 8 is a light-emitting diode, for example, for indicating the number of images which can be shot. The strobe LED 9 is a light-emitting diode for indicating charging. When the digital camera is not in the shooting mode, these AF LED 8 and strobe LED 9 can be used for other use, for example, for indicating accessing to the memory card.

The operation key unit SW1-SW13 are push buttons for inputting the instruction by user. The remote control light-sensitive portion 6 receives a signal from a remote control sender which is operated by user The sound record unit 400 includes a microphone 410 for inputting a sound by user, a microphone amplifier 420 for amplifying input sound signal, and a sound record circuit 430 for recording the amplified sound signal.

The sound reproduction unit 500 includes a sound reproduction circuit 530 for changing the recorded sound signal to an analog signal, an audio amplifier 520 for amplifying the analog signal output from the sound reproduction circuit 530 to drive a speaker, and a speaker 510 for outputting the reproduced sound.

The sensor unit 600 includes a A/D converter for converting a analog signal to a digital signal, and direction sensor 610 for detecting a direction or acceleration. A gyro sensor, an acceleration sensor, or a geomagnetism sensor can be used for the direction sensor 610. Particularly, if the geomagnetism sensor is used for detecting a direction, the size of the sensor 610 is downsized.

Figures 5, 5A, 5B:
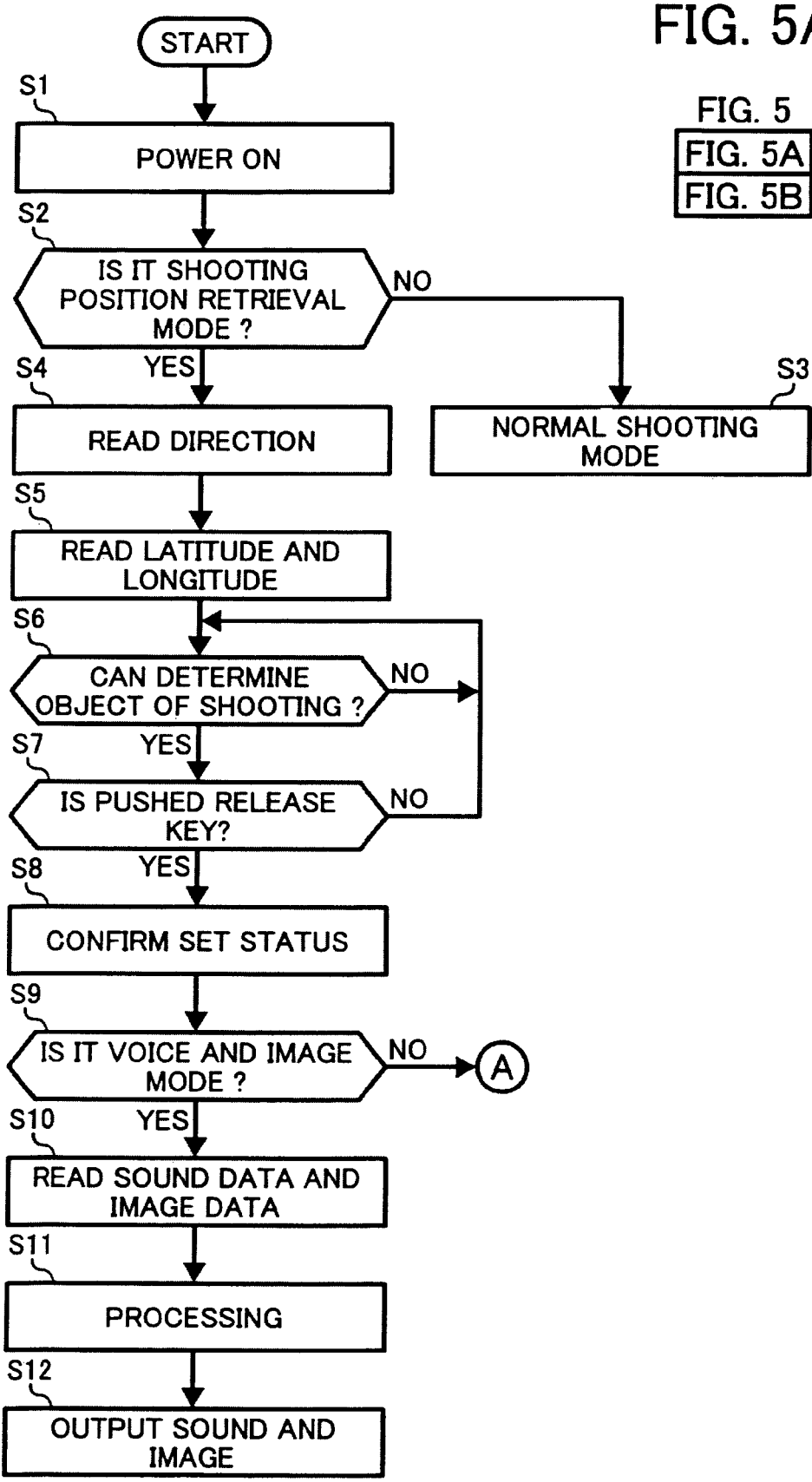
FIG. 5 is a flow chart showing a operation in a first embodiment according to one embodiment of the present invention.
Figure 5B:
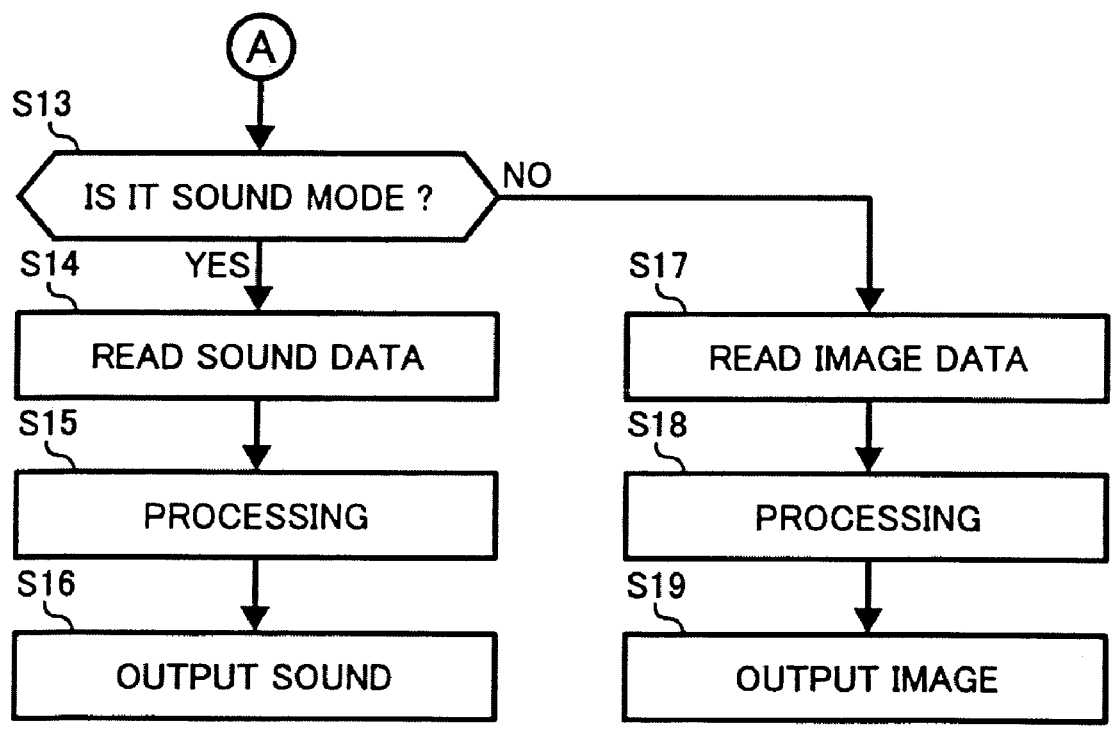

FIG. 5 is a flow chart showing a operation in a first embodiment according to the present invention.

First, a power on/off switch SW13 is turned on (step S1). Then, the digital camera processing unit 300 detects whether the camera is set in shooting position retrieval mode (step S2). If the camera is not set in shooting position retrieval mode, then the digital camera processing unit 300 carries out an operation in the normal shooting mode (step S3). In the step S2, if the camera is in shooting position retrieval mode, the digital camera processing unit 300 detects a direction of the digital camera by using an output signal from the direction sensor unit 610 (step S4). Then, the digital camera processing unit 300 obtains latitude information and longitude information from a GPS card inserted into a memory card slots 2 (step S5).

Next, the digital camera processing unit 300 compares a current camera position and predetermined position of the object of shooting previously stored. Also, the digital camera processing unit 300 detects whether a direction from a current camera position to the object of shooting accords to the direction where a camera faces. Hereby, the digital camera processing unit 300 judges whether a position (latitude, longitude) and a direction of a current camera show the predetermined object of shooting stored in the SDRAM 700 (step S6). At the step S6, if it is No, then step S6 is repeated. At the step S6, if it is Yes, the digital camera processing unit 300 detects whether a release key SW1 is pushed by half for focusing or not (step S7). If release key SW1 is pushed by half, then the digital camera processing unit detects the current setting state (step S8), and the digital processing unit 300 detects whether the camera is in a mode for providing notice to a user (step S9).

At the step S9, if it is Yes, the digital camera processing unit 300 reads sound and image data from SDRAM 700 (step S10), and processes the data for displaying a notice image and uttering the notice sound (step S11).

The notice image is displayed on the LCD monitor 10, and the notice sound is generated from the speaker 510 (step S12). Here, the notice image can be used for predetermined letters or characters, and the notice sound can be used for voice or music, or the sound of a buzzer can be used instead of the voice or music.

At the step S9, if it is No, the digital camera processing unit 300 detects if the camera is set to sound mode or not (step S13). If it is sound mode, the digital camera processing unit 300 reads sound data from SDRAM 700 (step S14), and processes the data for uttering the notice sound (step S15). The notice sound is generated from the speaker 510 (step S16).

At the step S13, if it is No, the digital camera processing unit 300 reads image data from SDRAM 700 (step S17), and processes the data for uttering the notice sound (step S18). The notice image is displayed on the LCD monitor 10 (step S19).

Figure 6B:
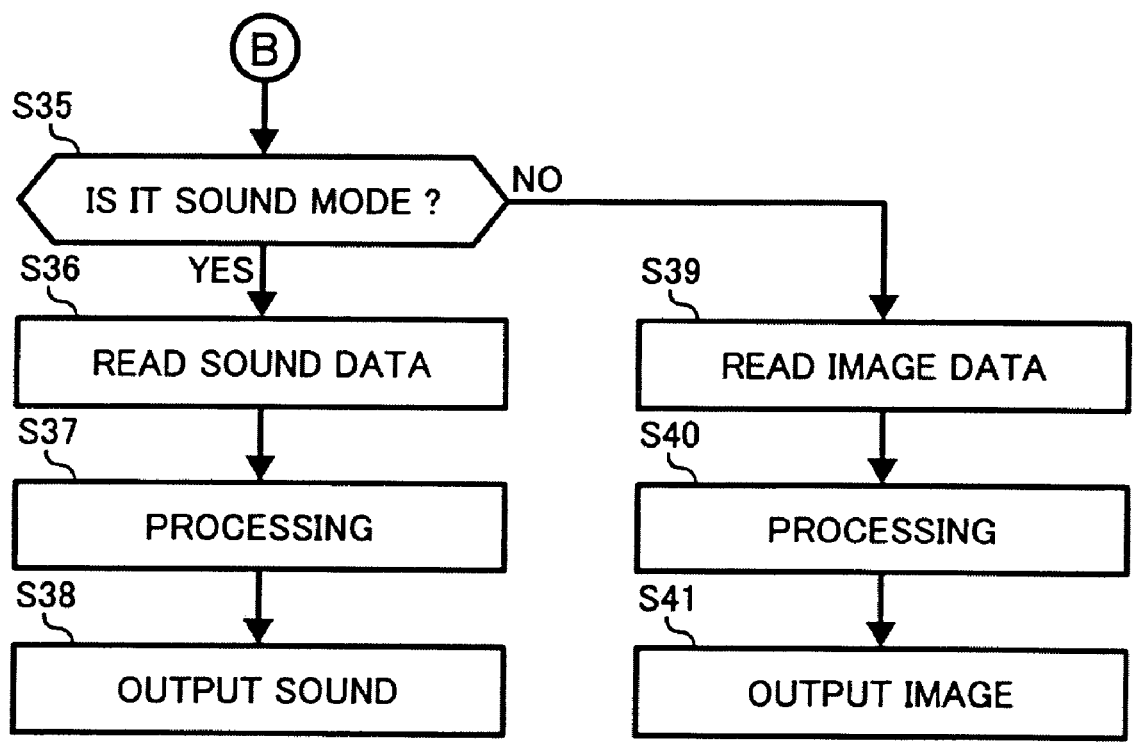
FIG. 6 is a flow chart showing a operation in a second embodiment according to one embodiment of the present invention.

FIG. 6 is a flow chart showing a operation in a second embodiment according to the present invention. The almost steps in the second embodiment is common to the first embodiment.

First, a power on/off switch SW13 is turned on (step S21). Then, the digital camera processing unit 300 detects whether the camera is set to shooting position retrieval mode (step S22). If the camera is not in shooting position retrieval mode, then the digital camera processing unit 300 carries out an operation in the normal shooting mode (step S23). In step 2, if the setting is shooting position retrieval mode, the digital camera processing unit 300 detects a direction that the digital camera is pointed, by using an output signal from the direction sensor unit 610 (step S24). Then, the digital camera processing unit 300 obtains latitude information and longitude information from a GPS card inserted into a memory card slots 2 (step S25).

The digital camera processing unit 300 then detects whether a release key SW1 is pushed by half for focusing or not (step S26). If release key SW 1 is pushed by half, then the digital camera processing unit processes the image data input by CCD 250 in the above mentioned way (step S27), and the digital camera processing unit 300 stores the latitude information and longitude information from a GPS, and direction information from the direction sensor. This information is associated with image data from the CCD 250, and stored in SDRAM 700 (step S28).

Next, the digital camera processing unit 300 compares a current camera position and predetermined position of the object to be shot. In addition, the digital camera processing unit 300 detects whether a direction from the current camera position to the object of shooting accords to the direction where a camera faces. Hereby, the digital camera processing unit 300 judges whether a position (latitude, longitude) and a direction of a current camera show the predetermined object of shooting stored in the SDRAM 700 (step S29). At the step S29, if it is No, then step S6, step 27, and step 28 are repeated. At the step S29, If it is Yes, the digital processing unit 300 detects if the camera is set to a mode to provide notice to user (step S30).

At the step S31, if it is Yes, the digital camera processing unit 300 reads sound and image data from SDRAM 700 (step S32), and processes the data for displaying a notice image and uttering the notice sound (step S33).

The notice image is displayed on the LCD monitor 10, and the notice sound is generated from the speaker 510 (step 34). Here, the notice image can be used for predetermined letters or characters, and the notice sound can be used for voice or music, or the sound of a buzzer can be used instead of the voice or music.

At the step S31, if it is No, the digital camera processing unit 300 detects if the camera is set to sound mode or not (step 35). If it is sound mode, the digital camera processing unit 300 reads sound data from SDRAM 700 (step S36), and processes the data for uttering the notice sound (step S37). The notice sound is generated from the speaker 510 (step 38).

At the step S35, if it is No, the digital camera processing unit 300 reads image data from SDRAM 700 (step S39), and processes the data for uttering the notice sound (step S40). The notice image is displayed on the LCD monitor 10 (step 41).

Here, notice image can be used for, for example, "The object of shooting is the Statue of Liberty".

Furthermore, in the second embodiment, the latitude and the longitude information, and the direction is stored in a space area of EXIF file, but also may be stored in alternative manners.

Figure 7:
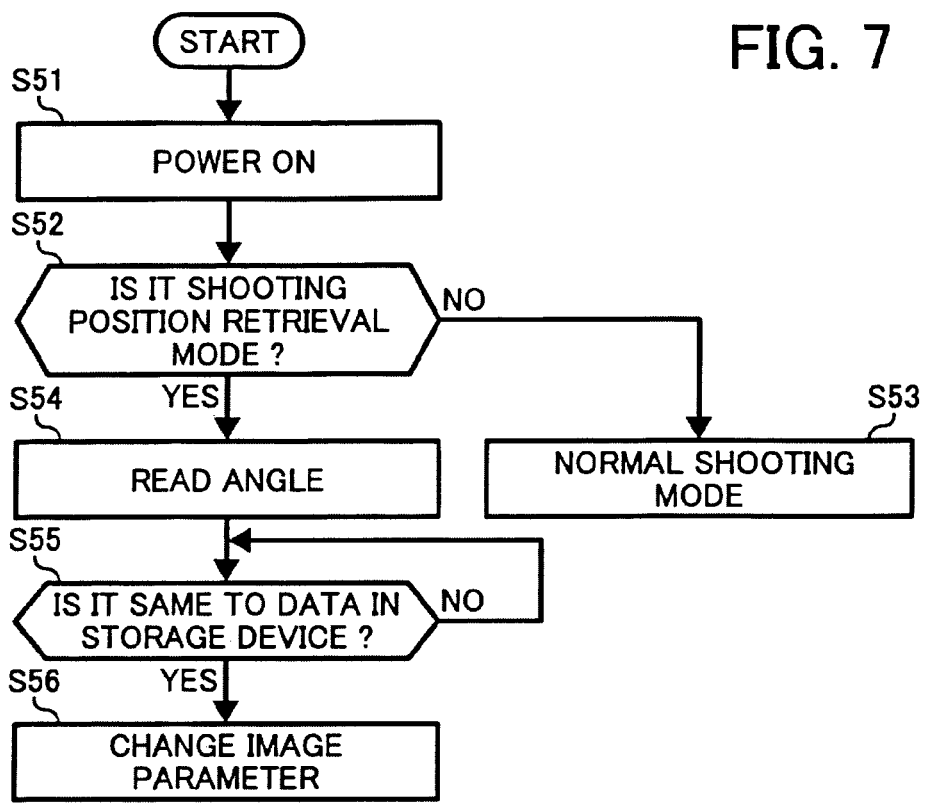
FIG. 7 is a flow chart showing a operation in a third embodiment according to one embodiment of the present invention.

FIG. 7 is a flow chart showing a operation in a third embodiment according to the present invention.

First, a power on/off switch SW13 is turned on (step S51). Then, the digital camera processing unit 300 detects whether the camera is set to shooting position retrieval mode (step S52). If the setting is not shooting position retrieval mode, then the digital camera processing unit 300 carries out an operation in the normal shooting mode (step S53). In the step S52, if the mode is shooting position retrieval mode, the digital camera processing unit 300 detects an angle which the digital camera is pointed, by using an output signal from the direction sensor unit 610 (step S54), which includes an acceleration sensor. The digital camera processing unit 300 detects the angle that the digital camera is pointed by using an output signal from the acceleration sensor. Next, the digital camera processing unit 300 judges whether the angle accords to the predetermined angle stored in the ROM 800 (step S55). At the step S54, if it is No, then step S55 is repeated. At the step S55, if it is Yes, the digital camera processing unit 300 changes the image parameters.

Figure 8:
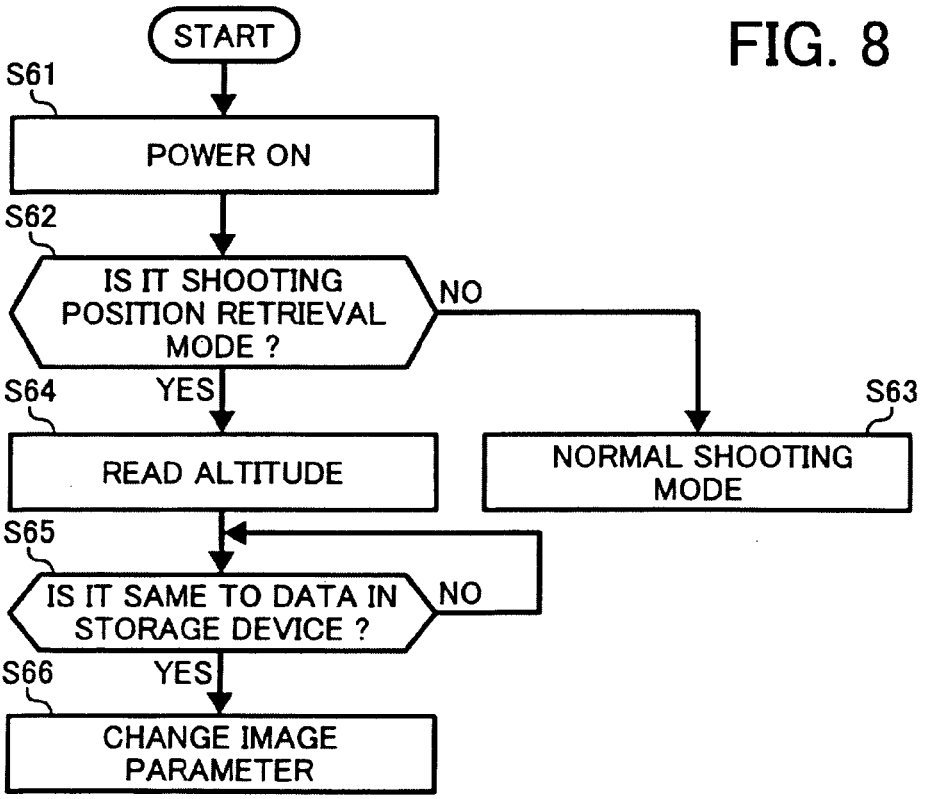
FIG. 8 is a flow chart showing a operation in a fourth embodiment according to one embodiment of the present invention.

FIG. 8 is a flow chart showing a operation in a fourth embodiment according to the present invention. The fourth embodiment is different from the third embodiment at the data which is used for changing the image parameter.

First, a power on/off switch SW13 is turned on (step S61). Then, the digital camera processing unit 300 detects whether the camera is set to shooting position retrieval mode (step S62). If the setting is not shooting position retrieval mode, then the digital camera processing unit 300 carries out an operation in the normal shooting mode (step S63). In the step S62, if the setting is shooting position retrieval mode, the digital camera processing unit 300 detects an altitude of the camera by using an output signal from the GPS card 60 (step S64). Next, the digital camera processing unit 300 judges whether the altitude accords to the predetermined altitude stored in the ROM 800 (step S65). At the step S64, if it is No, then step S65 is repeated. At the step S65, if it is Yes, the digital camera processing unit 300 changes the image parameters.

Figure 9:
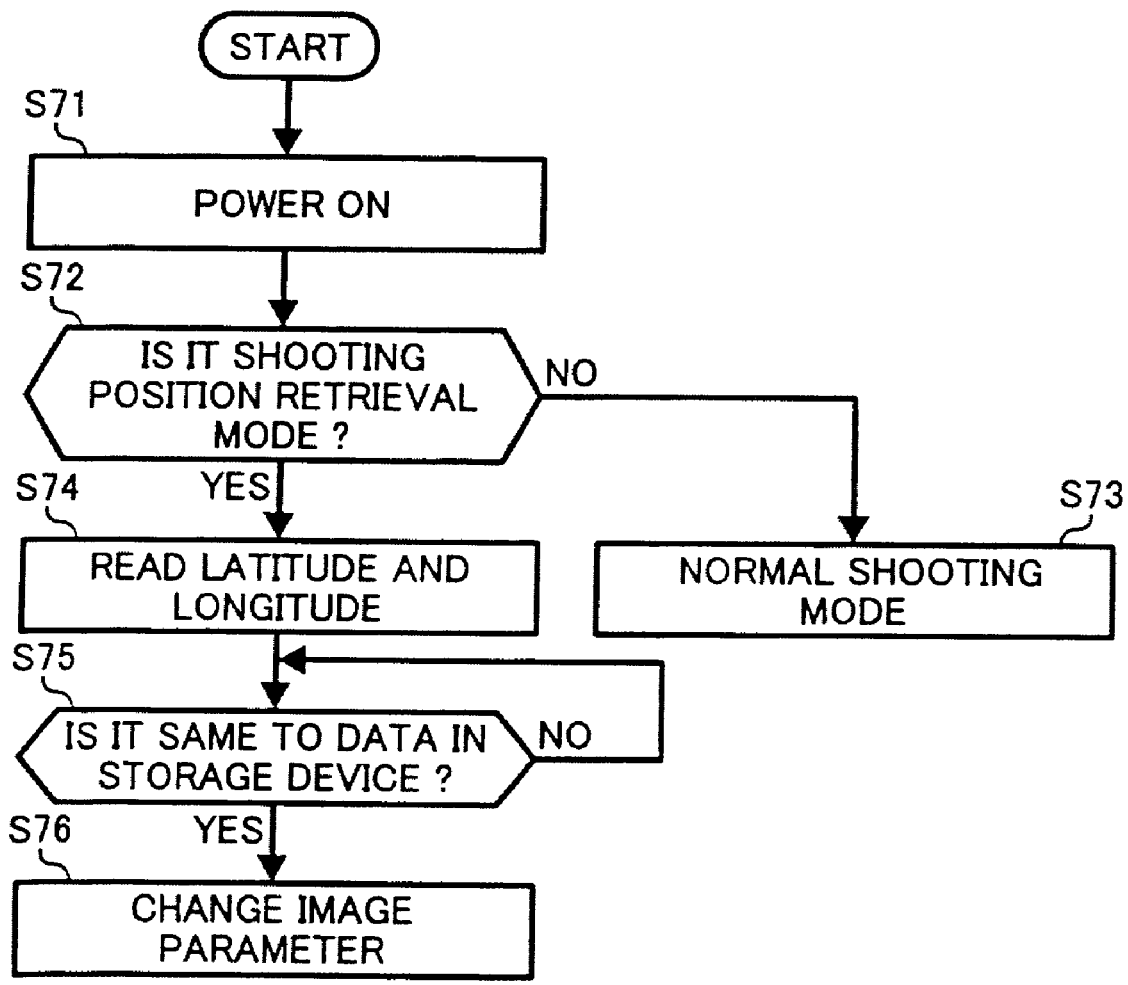
FIG. 9 is a flow chart showing a operation in a fifth embodiment according to one embodiment of the present invention.

FIG. 9 is a flow chart showing a operation in a fifth embodiment according to the present invention. The fifth embodiment is different from the fourth embodiment, with respect to the data used to change the image parameter.

First, a power on/off switch SW 13 is turned on (step S71). Then, the digital camera processing unit 300 detects whether the camera is set to shooting position retrieval mode (step S72). If the setting is not shooting position retrieval mode, the digital camera processing unit 300 carries out an operation in the normal shooting mode (step S73). In the step S72, if the setting is shooting position retrieval mode, the digital camera processing unit 300 detects the latitude and longitude of the camera by using an output signal from the GPS card 60 (step S74). Next, the digital camera processing unit 300 judges whether latitude and longitude accord to the predetermined the latitude and longitude stored in the ROM 800 (step S75). At the step S75, if it is No, then step S75 is repeated. At the step S75, if it is Yes, the digital camera processing unit 300 changes the image parameters.

Figure 10:
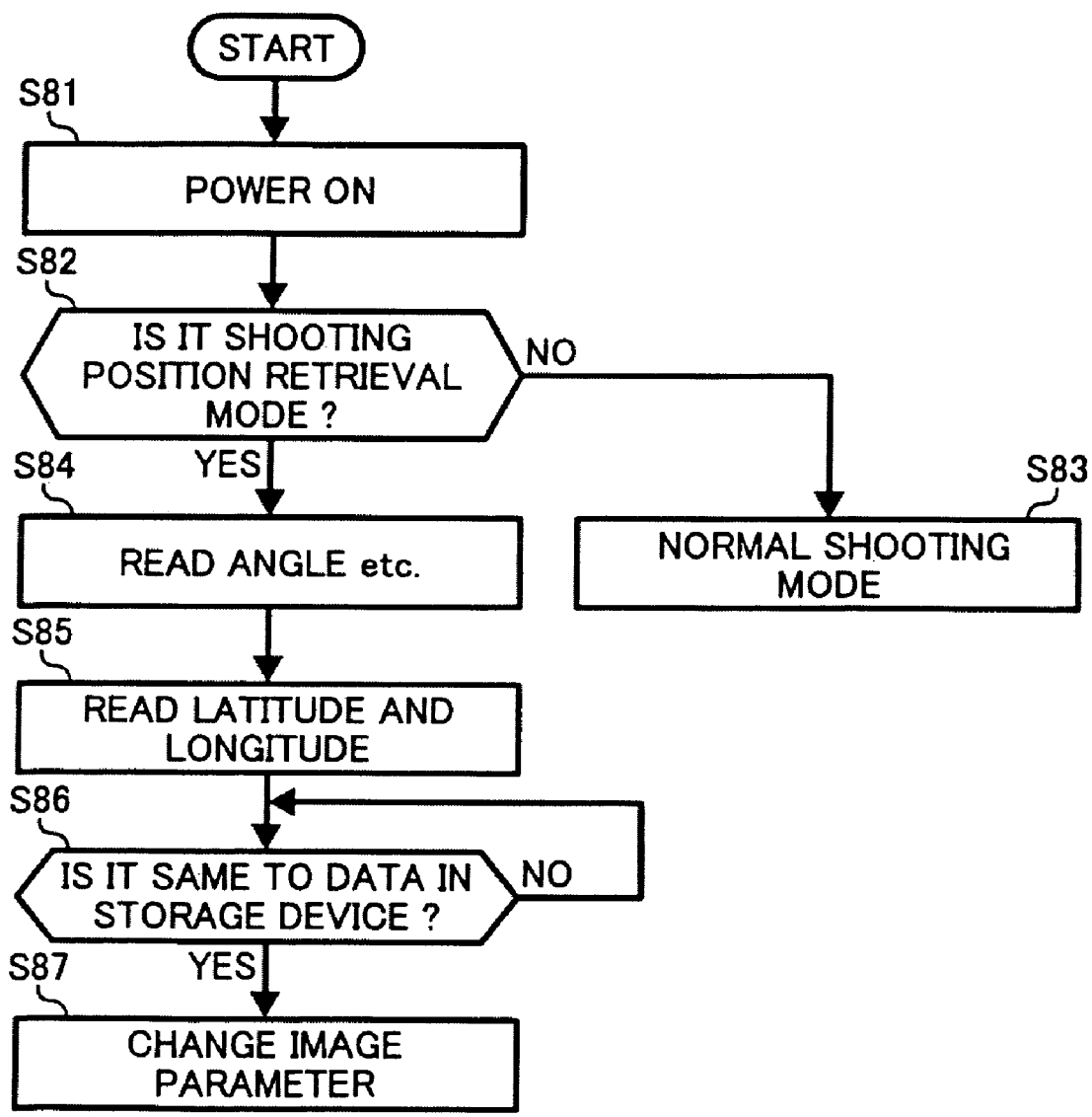
FIG. 10 is a flow chart showing a operation in a sixth embodiment according to one embodiment of the present invention.

FIG. 10 is a flow chart showing a operation in a sixth embodiment according to the present invention. The sixth embodiment is different from the fifth embodiment with respect to the data used for changing the image parameter.

First, a power on/off switch SW13 is turned on (step S81). Then, the digital camera processing unit 300 detects whether the camera is set to shooting position retrieval mode (step S82). If the setting is not shooting position retrieval mode, then the digital camera processing unit 300 carries out an operation in the normal shooting mode (step S83). In the step S82, if the setting is shooting position retrieval mode, the digital camera processing unit 300 detects an angle which the digital camera is pointed, by using an output signal from the direction sensor unit 610 (step S84), which includes an acceleration sensor. The digital camera processing unit 300 detects the angle which the digital camera is pointed by using an output signal from the acceleration sensor. The digital camera processing unit 300 then detects the latitude and longitude of the camera by using an output signal from the GPS card 60 (step S85)

Next, the digital camera processing unit 300 judges whether the angle, the latitude, and the longitude accord stored in the predetermined angle, latitude, and longitude stored in the ROM 800 (step S86). At the step S85, if it is No, then step S86 is repeated. At the step S86, if it is Yes, the digital camera processing unit 300 changes the image parameters.

In the above-mentioned embodiment, the image parameter changed is "white balance" is shown in Japanese Laid-open patent application 2004-080167 and Japanese Laid-open patent application 2004-064676.

Furthermore, although the present invention can be used for the digital camera, for example, the embodiments disclosed herein may be used for other mobile terminals such as a cellular phone having a function of camera.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be apparent to those skilled in the art.

Obviously, numerous modifications and variations of the present invention are possible in light of the above teachings. It is therefore to be understood that within the scope of the appended claims, the invention may be practiced otherwise than as specifically described herein.

That application is based on Japanese patent application 2005-210185 filed in the Japanese Patent Office on Jul. 20, 2005, the entire contents of which are hereby incorporated herein by reference.

The invention claimed is:

1. An image processing device comprising:
   an optical system configured to obtain an image of an object;
   a storage device configured to store a predetermined position of an object to be shot;
   a position detecting device configured to detect a current position of said image processing device;
   a direction detecting device configured to detect a directional orientation of said image processing device, and
   a processor configured to determine whether said obtained image of an object corresponds to said object to be shot based on a comparison between the stored predetermined position of an object to be shot and signals output from said position detecting device and said direction detecting device.

2. The image processing device of claim 1, further comprising:
   a module configured to output a notification that the obtained object corresponds to the object to be shot.

3. The image processing device of claim 1, wherein:
   the position detecting device comprises a GPS (Global Positioning System) module.

4. The image processing device of claim 1, wherein:
   the direction detecting device comprises a geomagnetism sensor.

5. The image processing device of claim 2, wherein:
   the module configured to output a notification comprises a display device.

6. An image processing device comprising:
   an optical system configured to obtain an image of an object;
   a storage device configured to store a predetermined parameter related to a status of the image processing device;

means for detecting a status of said image processing device, and means for changing said image parameter to the predetermined parameter in said storage device based on the signal output from said means for detecting a status.

7. The image processing device of claim 6, wherein:
said status is an angle indicating the directional orientation of said image processing device.

8. The image processing device of claim 6, wherein:
said status is an altitude of said image processing device.

9. The image processing device of claim 6, wherein:
said status is a combination of latitude and longitude of the image processing device.

10. A digital camera comprising:
an optical system configured to obtain an image of an object;
a storage device configured to store a predetermined position of an object to be shot;
a position detecting device configured to detect a current position of said image processing device;
a direction detecting device configured to detect a directional orientation of said digital camera, and
a processor configured to determine whether said obtained image of an object corresponds to the object to be shot based on a comparison between the stored predetermined position of the object to be shot and signals output from said position detecting device and said direction detecting device.

11. The digital camera of claim 10, further comprising:
means for outputting a notification that the obtained image of an object corresponds to the predetermined object to be shot.

12. The digital camera of claim 10, wherein:
the position detecting device comprises a GPS (Global Positioning System) module.

13. The digital camera of claim 10, wherein:
said direction detecting device comprises a geomagnetism sensor.

14. The digital camera device of claim 11, wherein:
the means for outputting a notification comprises a display device.

15. A method of capturing an image using an image processing device, comprising:
storing a position of an object to be shot;
obtaining an image of an object within the field of view of the image processing device;
determining a current position of the image processing device; and
comparing the stored position of the object to be shot to the current position of the image processing device to determine if said object within the field of view of the image processing device corresponds to the object to be photographed.

16. A computer program product comprising a computer storage medium storing a computer program code mechanism, which when executed by an image processing device, causes the image processing device to perform a method of capturing an image, comprising:
storing a position of an object to be shot;
obtaining an image of an object within the field of view of the image processing device;
determining a current position of the image processing device; and
comparing the stored position of the object to be shot to the current position of the image processing device to determine if said object within the field of view of the image processing device corresponds to the object to be photographed.

* * * * *